(12) United States Patent
Gatzen et al.

(10) Patent No.: US 10,857,622 B2
(45) Date of Patent: Dec. 8, 2020

(54) METHOD FOR STRUCTURING A SUBSTRATE SURFACE

(71) Applicant: FORSCHUNGSZENTRUM JUELICH GmbH, Juelich (DE)

(72) Inventors: Caren Sophia Gatzen, Aachen (DE); Daniel Emil Mack, Cologne (DE); Martin Tandler, Viersen (DE); Robert Vassen, Herzogenrath (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 16/619,493

(22) PCT Filed: Jun. 13, 2018

(86) PCT No.: PCT/DE2018/000184
§ 371 (c)(1),
(2) Date: Dec. 5, 2019

(87) PCT Pub. No.: WO2019/007449
PCT Pub. Date: Jan. 10, 2019

(65) Prior Publication Data
US 2020/0198048 A1   Jun. 25, 2020

(30) Foreign Application Priority Data

Jul. 6, 2017   (DE) .......... 10 2017 006 358

(51) Int. Cl.
*B23K 26/00*   (2014.01)
*B23K 26/03*   (2006.01)
(Continued)

(52) U.S. Cl.
CPC .......... *B23K 26/032* (2013.01); *B23K 26/034* (2013.01); *B23K 26/0622* (2015.10);
(Continued)

(58) Field of Classification Search
CPC .... B23K 26/03; B23K 26/032; B23K 26/034; B23K 26/06; B23K 26/0622;
(Continued)

(56) References Cited

U.S. PATENT DOCUMENTS 4,128,752 A * 12/1978 Gravel ............... B44B 7/00
219/121.68
4,786,358 A * 11/1988 Yamazaki .......... G02F 1/13439
219/121.69
(Continued)

FOREIGN PATENT DOCUMENTS

DE   102008040782 A1   2/2010
DE   102009051717 A1   5/2011
(Continued)

OTHER PUBLICATIONS

Choi, et al. "Delamination of Multilayer Thermal Barrier Coatings," *Mechanics of Materials* 31: 431-447 (Mar. 9, 1999).
(Continued)

*Primary Examiner* — Hung D Nguyen
(74) *Attorney, Agent, or Firm* — Leydig, Voit & Mayer, Ltd.

(57) ABSTRACT

A method for generating a structured surface on a substrate includes analyzing a substrate surface of the substrate and selecting, as a function of a condition of the substrate surface, method parameters including focus diameter, pulse peak power, pulse energy, point spacing, pulse length, pulse spacing and/or pulse sequence. The method further includes generating, by partial ablation and partial deposition via treatment with an intensive pulsed laser beam, surface structures having dimensions in the sub-micrometer range such that a multi-scale surface structure in the sub-micrometer and micrometer range adapted to intrinsically inhomogeneous properties of the substrate surface in the sub-
(Continued)

micrometer range is generated. The substrate is an inhomogeneous substrate.

12 Claims, 5 Drawing Sheets

(51) Int. Cl.
*B23K 26/0622* (2014.01)
*B23K 26/352* (2014.01)
*B23K 26/08* (2014.01)
*B23K 26/36* (2014.01)
*B23K 26/14* (2014.01)
*B23K 103/16* (2006.01)

(52) U.S. Cl.
CPC .......... *B23K 26/08* (2013.01); *B23K 26/3584* (2018.08); *B23K 26/36* (2013.01); *B23K 2103/16* (2018.08)

(58) Field of Classification Search
CPC .............. B23K 26/0624; B23K 26/063; B23K 26/064; B23K 26/0648; B23K 26/0655; B23K 26/066; B23K 26/08; B23K 26/082; B23K 26/083; B23K 26/354; B23K 26/355; B23K 26/3584; B23K 26/36; B23K 26/361; B23K 26/364; B23K 2103/04; B23K 2103/10; B23K 2103/14; B23K 2103/15; B23K 2103/16

USPC .......................................... 219/121.6–121.72
See application file for complete search history.

(56) References Cited

U.S. PATENT DOCUMENTS

| | | |
|---|---|---|
| 6,120,725 A | 9/2000 | Asahi et al. |
| 2011/0177286 A1 | 7/2011 | Aichele et al. |
| 2011/0245074 A1* | 10/2011 | Smith .................. B01J 37/0238 502/309 |
| 2013/0020297 A1 | 1/2013 | Gupta et al. |
| 2015/0183056 A1 | 7/2015 | Niggemann |
| 2016/0318292 A1 | 11/2016 | Jürgens et al. |

FOREIGN PATENT DOCUMENTS

| | | |
|---|---|---|
| DE | 102010042503 A1 | 4/2012 |
| DE | 102012107827 A1 | 2/2014 |
| EP | 2669040 A1 | 12/2013 |
| WO | WO 2019007449 A1 | 1/2019 |

OTHER PUBLICATIONS

Liu, et al. "Delamination in Patterned Films," *International Journal of Solids and Structures* 44: 1706-1718 (Aug. 4, 2006).

You, et al. "Review of Laser Welding Monitoring," *Science and Technology of Welding & Joining* 19, 3: 181-201 (Dec. 19, 2013).

* cited by examiner

METHOD FOR STRUCTURING A SUBSTRATE SURFACE

CROSS REFERENCE TO RELATED APPLICATIONS

This application is a U.S. National Phase Application under 35 U.S.C. § 371 of International Application No. PCT/DE2018/000184, filed on Jun. 13, 2018, and claims benefit to German Patent Application No. DE 10 2017 006 358.3, filed on Jul. 6, 2017. The International Application was published in German on Jan. 10, 2019 as WO 2019/007449 under PCT Article 21(2).

FIELD

The invention relates to the field of ceramics, metals and inorganic composites and concerns in particular the increase of adhesive strength for thermally sprayed coatings applied thereupon.

BACKGROUND

The adhesive strength of thermally sprayed coatings—in addition to adapted thermomechanical properties—is essentially determined by the roughness and the geometric profile of the interface between the substrate and the sprayed coating. On the one hand, the geometric shape of the interface must provide sufficient starting points to allow the sprayed layer to interlock with the substrate; on the other hand, stress peaks in the area of the boundary layer must be avoided and/or crack propagation must be limited.

The top layers of fiber composites produced by pre-impregnated laminates or by infiltration of fiber layers are generally too smooth to ensure the sufficient interlocking of thermally sprayed layers at least above a layer thickness of approximately 20 µm, which is typically required for gas-tight layers, without the use of an additional adhesion promoting layer.

Therefore, as a rule, adhesion promoting layers with increased irregular roughness are applied by alternative processes, such as suspension application and corresponding sintering.

However, this disadvantageously means higher production costs. In addition, the roughness achieved is regularly determined by the suspension properties used and is mesoscopically homogeneous.

An alternative to generating fractal geometries on a sub-micrometer scale on the surface of a substrate has already been demonstrated by treatment with pulsed laser radiation.

Thus, U.S. Pat. No. 6,120,725 discloses a process for generating a surface with a complex profile and dimensions in the sub-micrometer range by means of a laser. The complex profile is initially broken down into a large number of simple regular sinusoidal curves with different parameters. The laser beam is then directed over the entire surface of the substrate by means of masks or other optical aids, wherein a simple regular sine function is imaged on the surface of the substrate by means of ablation. By repeatedly traversing the surface during which different sinusoidal functions are mapped, a complex surface structure is created by superimposing the individual curves.

Furthermore, DE 10 2009051717 A1 discloses a thermal coating method with which the surface of the workpiece to be coated is roughened prior to coating. For this purpose, a laser is used to irregularly introduce a multiple number of microstructure elements into the surface of the component to be coated. A pulsed laser is guided over the surface of the workpiece. By increasing the temporal overlap of individual radiation pulses and/or by simultaneously reducing the radiation pulse energy, for example, the vapor pressure generated on the surface to be roughened can be reduced, such that a statistically irregular roughness is generated on the surface. By means of the mentioned variations, the ablation rate should be influenced in such a manner that the depth dimensions of the structural elements are varied (stochastically), in part also with undercut.

EP 2669040 A1 describes a method for the nanostructuring of ceramic, glass, carbon, boron, silicon and composite materials, with which the surface is traversed one or more times with a pulsed laser in such a manner that adjacent light spots of the laser beam collide or overlap without gaps, wherein a certain range of a predetermined relation between method parameters is maintained.

SUMMARY

In an embodiment, the present invention provides a method for generating a structured surface on a substrate. The method includes analyzing a substrate surface of the substrate and selecting, as a function of a condition of the substrate surface, method parameters including focus diameter, pulse peak power, pulse energy, point spacing, pulse length, pulse spacing and/or pulse sequence. The method further includes generating, by partial ablation and partial deposition via treatment with an intensive pulsed laser beam, surface structures having dimensions in the sub-micrometer range such that a multi-scale surface structure in the sub-micrometer and micrometer range adapted to intrinsically inhomogeneous properties of the substrate surface in the sub-micrometer range is generated. The substrate is an inhomogeneous substrate.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
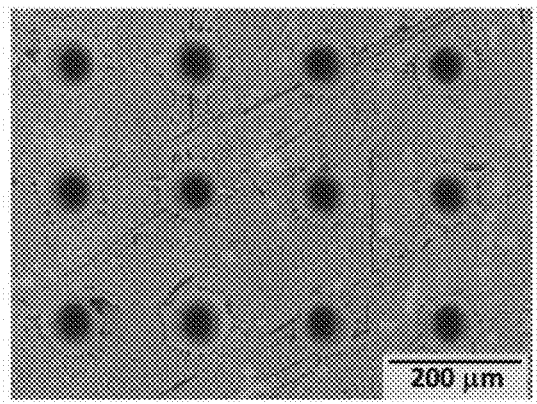
FIGS. 1a and 1b show pot profiles generated in a plan view (1a) and in cross-section, together with a top layer made of $Y_2O_3$, (1b) produced by plasma spraying.

The aforementioned methods require either the use of a separate adhesion promoting layer and thus the need for additional heat treatment, which may contribute adversely to the aging/degradation of the component, or the aforementioned surface structuring is limited to the generation of homogeneous surface roughnesses on a sub-micrometer scale.

The generation of a surface structure that optimizes both interlocking and crack propagation behavior in relation to the material used has only been achievable to date with the known methods by using multi-stage procedures and complex masking.

In addition, the generation of homogeneous surface roughness profiles or the use of uniform laser parameters represents a significant limitation, in particular in the case of intrinsically inhomogeneous substrates, such as fiber composites or thin-walled structures, whose mechanical and thermophysical properties vary in the area of the surface to be coated, such that it would be advantageous, for a more homogeneous result, to adapt the laser processing parameters to the local thermophysical properties, or the roughness profile to be generated to the local thermomechanical properties of the substrate.

The present invention provides methods for structuring a substrate surface for the subsequent application of a thermally sprayed layer, with which an interlocking, which is improved compared to that known in the prior art, of the sprayed layer to the substrate is made possible, and stress peaks in the area of the boundary layer can also be avoided and crack propagation can also be limited.

Furthermore, the present invention provides methods for structuring a substrate surface for the subsequent application of a thermally sprayed layer, which take into account the intrinsically inhomogeneous properties of the substrate surface in the sub-millimeter range and can produce a microstructuring adapted thereto.

Within the framework of the invention, it has been recognized that the treatment of a substrate surface with intensive laser radiation produces partly destructive, multi-scale surface structures on a sub-micrometer and micrometer scale, which directly improve the conditions for adhesive strength and cyclicability of the coatings sprayed thereupon.

According to the prior art, the efficiency of laser drilling/structuring with laser radiation in the nanosecond range is essentially influenced by the extent to which the vaporized or molten material components are catapulted directly out of the arising cavity by the plasma or vapor that was produced. Thus, the ablation rate routinely increases disproportionately with increasing laser power density, since recondensation is suppressed.

The invention recognizes that the interaction of preheated and partially melted material with the pulsed laser beam can be used advantageously in a different manner, in so far as the method parameters (e.g. power density, pulse length, temporal and local overlap) are selected in such a manner that the material is preferably melted and recondensed or distributed by laser-induced plasma eruptions in the vicinity of the current laser position (curled up in the vicinity of the impact point of the laser beam) and thus an irregular roughness is generated on a sub-micrometer scale.

The necessary change of the method parameters compared to the usual generation of a deep ablation therefore provides that, in accordance with the invention:
 a lower pulse peak power is selected,
 a slow heating of larger areas of the substrate surface to near the melting point is caused by:
  an increased spatial proximity of the laser positions, and/or
  a temporal proximity of the laser pulses, and/or
  an increase in the pulse duration.

Within the framework of the invention, it has been found that, as a function of the selected method parameters, a more concrete, pot-like structure, on the one hand, and a more irregular fine structure (cauliflower-like structure), on the other hand, can be generated. In this regard, see FIGS. 1a and 1b. These can be generated in close proximity to each other or overlaid at the same time.

According to the invention, method parameters are now proposed which, on the one hand, lead to a structuring of the surface on a micrometer scale, but which at the same time are overlaid by a further structure on a sub-micrometer scale. This combination is particularly advantageous for improving the adhesion between the surface of a substrate treated in this manner and a thermally sprayed layer applied subsequently, if necessary.

Structuring on a sub-micrometer scale is understood to mean that the structures generated predominantly contain elements (e.g. constrictions, overhangs, particles) with dimensions below one micrometer and up to a few (single-digit) micrometers.

In contrast to the prior art known to date, a pulsed, focused laser without any other optical aids such as masks, diaphragms or complex lenses, is specifically guided over the surface of the substrate to be roughened, wherein freely selectable points of a dot grid are approached and irradiated with the laser.

The dimensions of typical focused laser spots on the surface are between 10-5000 µm, preferably between 20-100 µm.

The following materials or material mixtures, for example, can be used as substrates: a ceramic, an inorganic glass, carbon, boron or silicon, an inorganic fiber and/or a non-fibrous carbon, a composite material containing boron nitride with a ceramic and/or carbon matrix, a metal-ceramic composite material or a composite material made of a metal and/or a metal alloy that has thermally conductive particles and/or fibers containing carbon and/or boron nitride.

Preferably, within the method according to the invention, the points with laser beam diameters of 20 µm to 100 µm on the surface of the substrate are approached and irradiated with a spacing between two points in a range between one-half and up to 10 times the beam diameter. The surface of the substrate is advantageously irradiated with pulses having a pulse length between 1 ns and 1000 ns, with a sequence between 5 and 500 pulses each and having a pulse interval between 50 ns and 1 s and pulse peak powers between 1 kW and 100 kW.

Depending on the method variant, the individual points of the dot grid (positions), for example, can be irradiated one after the other with fixed method parameters, such as pulse peak power, pulse power, pulse length, pulse sequence and pulse spacing.

An additional method variant provides that the individual points of the dot grid are approached one after the other, but the method parameters such as pulse peak power, pulse power, pulse length, pulse sequence and pulse spacing, can be individually varied from point to point. In addition, the pulse spacing can be varied between the individual pulses at one position.

An additional method variant provides that at least individual points of the point grid are also approached and irradiated twice or more times, wherein with this method variant, both fixed (identical) and variable method parameters can be selected from point to point for the repetitions.

For ablative structuring, pulsed lasers with pulse lengths in the fs and ps range and pulse peak powers from 100 W to 10 MW can be used optionally and with higher efficiency/higher geometric accuracy. Preheating the substrate is optionally also possible with pulsed lasers with pulse sequences/pulse lengths in the range of ms and even "continuous wave" (cw) if the power is low enough. These can be integrated into the structure as additional beam sources. Fine structuring by "curling up" is preferably achieved by ns lasers.

The wavelength of the laser used depends on the absorption properties of the substrate material and a laser with a sufficiently high degree of absorption (e.g. greater than 5%) for the generated wavelength can be selected accordingly by a person skilled in the art.

The laser cross-section is initially only relevant with regard to the dimensions of the ablative structures generated (not significantly smaller than the focus diameter). In addition, the intensity related to the area is of particular importance.

In this regard, high pulse peak power or a high radiation intensity has the effect that, at a sufficiently high intensity, the absorption probability increases due to multiple excitations and thus the heat input is limited to boundary layers near the surface.

An increased pulse length has the effect that the laser energy is introduced over a longer period of time, such that the temperature rise at the processing location is reduced by parallel heat dissipation into adjacent volumes.

On the other hand, a shorter sequence of 10 pulses, for example, compared to a longer sequence of 500 pulses, for example, primarily causes an increased amount of energy to be introduced into the material, such that larger volumes or adjacent areas can also be heated up to or above the melting point by means of heat dissipation.

The choice of the pulse spacing has effects on the degree to which the irradiated material can release energy to its vicinity and cool down by heat dissipation before the temperature is increased again by a further radiation pulse, where necessary.

A long pulse spacing and, in particular, multiple irradiation advantageously render a predominantly ablative behavior with only small structural components in the sub-micrometer range achievable, even at high pulse powers or pulse lengths in the ns range.

Depending on the requirements, the person skilled in the art can thus select from one of the method variants mentioned and influence the generated surface structure by means of the specific adjustment of the method parameters, such as pulse peak power, pulse power, focus diameter, pulse length and/or sequence and/or pulse spacing.

Such a targeted procedure has the advantage that the material of the substrate ablated by the impinging laser beam can be redeposited at least partially outside the laser beam area. This advantageously leads to a further increase in roughness. Moreover, it can be ensured in this manner that, in addition to structuring on a sub-micrometer scale, an additional structuring on a much larger scale, for example in the millimeter range, is also generated, which is advantageously overlaid on a sub-micrometer scale.

It is known from the literature [1] that the adhesion mechanisms and tolerable stress states on inhomogeneous or structured substrates are also regularly inhomogeneous in a similar form, and therefore an adaptation of the interface structure to the underlying intrinsic structure of the substrate would be sensible. Important influencing factors are material and structural properties, such as elastic parameters, fracture toughness, porosity, fiber orientation and layer thicknesses [2].

Therefore, a method that, on the one hand, is suitable for generating the required variations in the vertical roughness of the substrate surface, is required. For coatings produced by plasma sprays (PS), the required roughness is regularly in the range of sub-micrometers up to several 10 micrometers.

On the other hand, the method can be advantageously suited to adapt the method parameters as a function of the intrinsic structural variations present under the substrate surface in a comparable local resolution. Typical dimensions for the intrinsic structural variations in fiber composites are derived directly from the dimensions of the components used in the composite material (e.g. cross-sections of the individual fibers typically in the range of 5 µm to 40 µm, cross-sections of fiber bundles typically in the range of 50 µm to 500 µm, layer spacings in the lamination from typically 100 µm to 1 mm). The surface topographies to be generated can therefore neither be described as homogeneous on the surface nor as stochastic.

In this respect, the method according to the invention for structuring a surface is particularly suitable for structuring the surfaces of inhomogeneous substrates, for example substrates containing fibers.

Of particular importance for this type of substrate are the base material, such as, for example, $Al_2O_3$, $ZrO_2$, silicates, SiC, carbon, iron, Ni-based alloys, etc., or its density/porosity in the matrix and the fiber density. Such locally varying material parameters decisively influence optical absorption properties, thermal conductivity/thermal diffusivity along with the thermal capacity of the area to be structured.

In addition, the layer thickness of the superficial matrix layers and/or the spacing between the fiber bundles and the surface are important parameters that determine the mechanical properties of the substrate and thus the selection of the surface topography to be generated.

The method according to the invention makes use of the essential influence of heat dissipation in the field of ns pulse laser processing, in order to, in a suitable combination through long and/or repeated irradiation with a low pulse peak power, generate an irregular surface structure in the range of sub-micrometers to a few micrometers of profile depth or, by ablative processing with the same (ns) laser or other laser sources with shorter pulses but a significantly higher pulse peak power, generate relatively coarser structures for optimized limitation of crack propagation (buckling delamination).

Typically, higher thermal conductivity is observed in substrate areas with a high fiber density or with fibers running just below the substrate surface than in areas in which the (porous) matrix is predominantly present near the surface.

Therefore, in areas of the substrate surface with a low fiber content and/or with deep fibers, i.e. with a predominantly porous matrix, it will generally be possible to more easily or quickly achieve heating of larger substrate areas with limited laser peak power and "splashing" in the boundary layer than in areas with a higher fiber density or fibers running close to the surface.

The generation of a so-called "cauliflower structure" is thus possible for such areas with fewer and/or shorter pulses in the ns range.

Therefore, in order to enable a structuring that is advantageously adapted to the surface structure of the substrate, a method is required that in particular allows a variation with respect to the point spacing.

In addition, the method according to the invention for this type of structuring adapted to the surface provides for an analysis of the substrate surface by means of the laser prior to the actual structuring, such that a variation of the method parameters preferably takes place as a function of the surface condition. In particular, the presence of fibers, their orientation, their proportion in the matrix and their position in relation to the surface are to be taken into account.

The invention will be explained in more detail below using some advantageous exemplary embodiments and figures, without this leading to a restriction of the scope of protection. A person skilled in coating can easily extract the corresponding parameters for the method according to the invention that are required for a desired roughening/structuring of the substrate to be coated.

A. Preliminary Investigations

The untreated surface of a composite oxide ceramic fiber/oxide ceramic matrix ($Al_2O_3$ fibers in a matrix of $Al_2O_3/ZrO_2$) accessible to a laser beam was treated without any pre-treatment with a pulsed fiber laser of a wavelength of 1062 nm at ambient atmosphere, pressure and temperature.

For this purpose, on the one hand:
  at the positions of a freely selected point grid with a spacing between two points of at least 200 μm each,
  with a pulsed laser beam,
  with a focus diameter of 40 μm,
  with a pulse length of 200 ns,
  with a pulse peak power of approximately 15 kW,
  in a sequence of 50 pulses each,
  with a pulse spacing of $1/f=1/20$ kHz=50 ns,
a structure was generated, which in each case consists of a regular pot profile of approximately 45 μm in diameter and 70 μm in depth, along with a surrounding area with irregular curling up from sub-micrometers to a few micrometers in height.

Figure 1B:
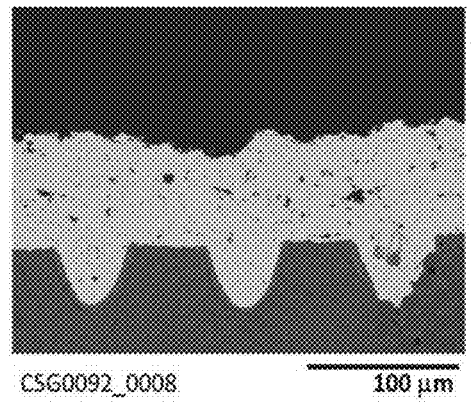

FIGS. 1a and 1b show the pot profiles generated in a plan view (1a) and in cross-section, together with a top layer made of $Y_2O_3$ (1b) produced by plasma spraying.

On the other hand, in another untreated sample:
  at the positions of a freely selected point grid with a spacing between two points of typically 30 μm,
  with a pulsed laser beam,
  with a focus diameter of 40 μm,
  with a pulse length of 50 ns,
  with a pulse peak power of approximately 15 kW,
  in a sequence of 500 pulses each,
  with a pulse spacing of $1/f=1/20$ kHz=50 ns,
a cauliflower-like structure was generated which in each case consists of a completely irregular profile with substructures ranging from sub-micrometers to a few micrometers in height.

Figure 2A:
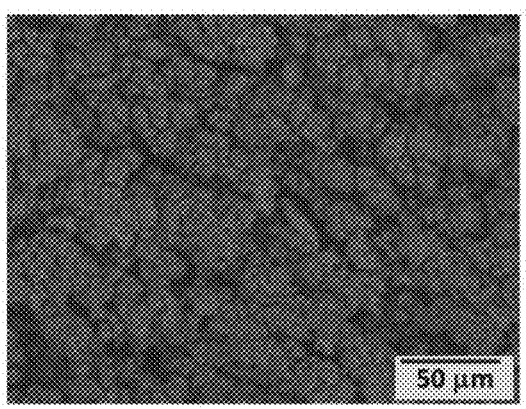
FIGS. 2a and 2b show corresponding structures in a plan view (2a) and cross-section together with a top layer made of $Y_2O_3$ (2b) produced by plasma spraying.
Figure 2B:
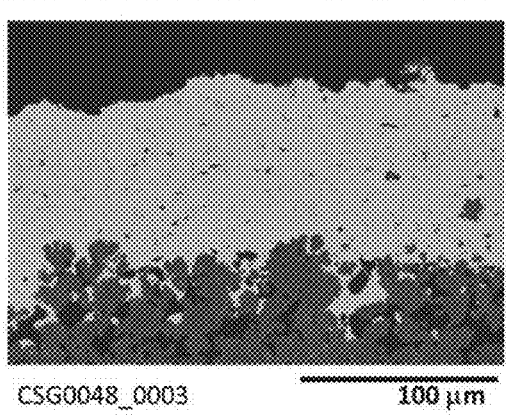

FIGS. 2a and 2b show corresponding structures in a plan view (2a) and cross-section together with a top layer made of $Y_2O_3$ (2b) produced by plasma spraying.

B. Exemplary Embodiments

1. The untreated surface of a composite oxide ceramic fiber/oxide ceramic matrix ($Al_2O_3$ fibers in a matrix of $Al_2O_3/ZrO_2$) accessible to a laser beam as a substrate was treated without any pre-treatment with a pulsed fiber laser of a wavelength of 1062 nm at ambient atmosphere, pressure and temperature.

Figure 3A:
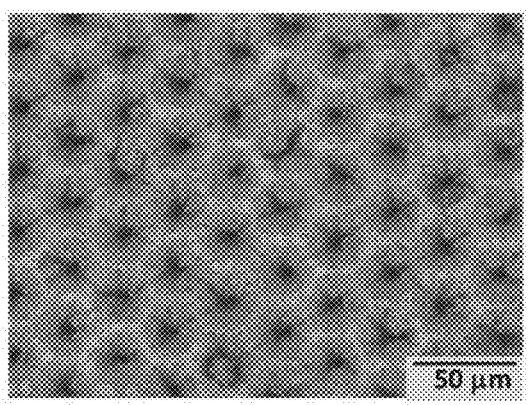
FIGS. 3a and 3b show the result of a structuring according to embodiments of the invention.
Figure 3B:
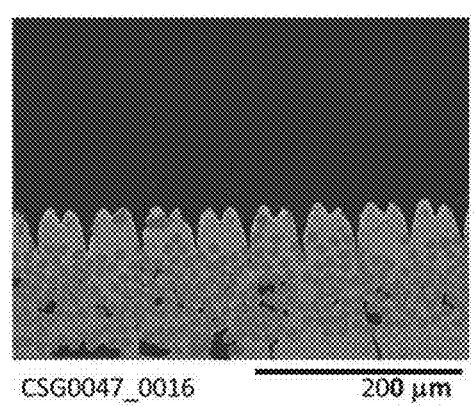
Figure 4A:
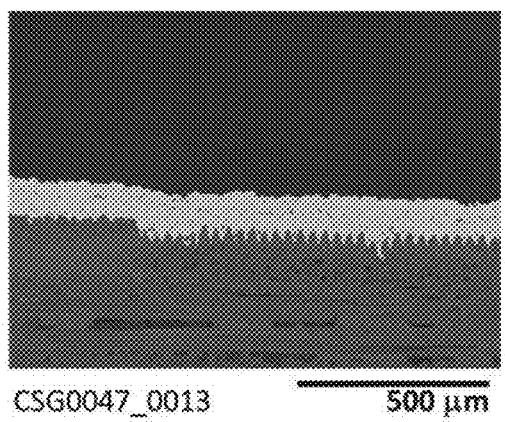
FIGS. 4a to 4d show results of sub-micrometer and micrometer structuring according to embodiments of the invention.
Figure 4B:
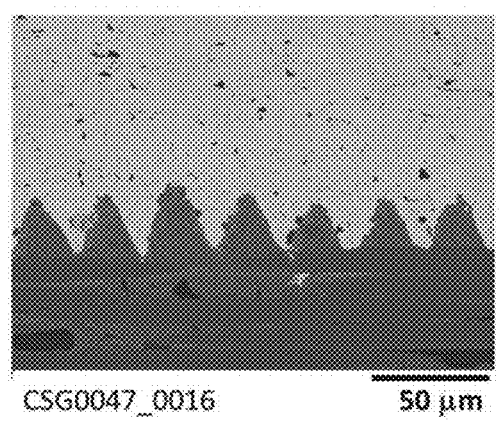
Figure 4C:
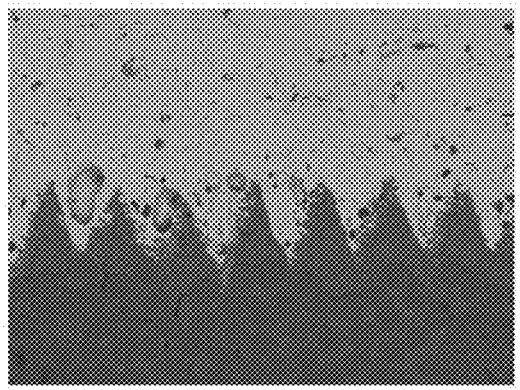
Figure 4D:
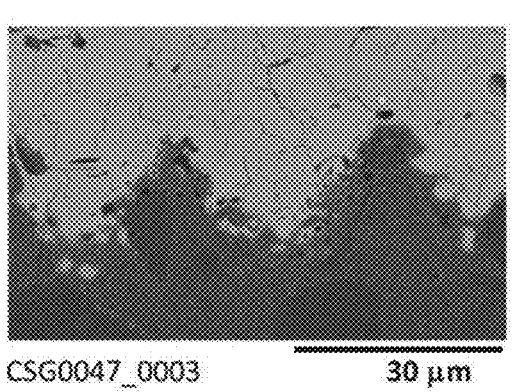

For this purpose, on the surface of the substrate, including:
  at the positions of a freely selected dot grid with a spacing of 30 μm each,
  with a pulsed laser beam,
  with a focus diameter of 40 μm,
  with a pulse length of 50 ns,
  with a pulse peak power of approximately 15 kW,
  in a sequence of 500 pulses each,
  with a pulse spacing exceeding 500 ms,
a structure was generated, which in each case consists of a regular profile with inclined edges and profile tips in the range of a few micrometers in width. The depth of the profile was regularly between 30 and 50 μm. The result of this structuring is shown in FIGS. 3a and 3b.

2. The untreated surface of a composite oxide ceramic fiber/oxide ceramic matrix ($Al_2O_3$ fibers in a matrix of $Al_2O_3/ZrO_2$) accessible to a laser beam as a substrate was treated without any pre-treatment with a pulsed fiber laser of a wavelength of 1062 nm at ambient atmosphere, pressure and temperature.

For this purpose, on the surface of the substrate:
  at the positions of a freely selected dot grid with a spacing of 30 μm each,
  with a pulsed laser beam,
  with a focus diameter of 40 μm,
  with a pulse length of 50 ns,
  with a pulse peak power of approximately 15 kW,
  in a sequence of 500 pulses each,
  with a pulse spacing of 50 ns to 1 s
  with time-shifted/switching/alternating irradiated/approached positions,
structures are generated, each of which consists of a pot profile of approximately 30 μm in diameter and 10 to 40 μm in depth, along with a differently pronounced irregular fine structure in the range from sub-micrometers to a few micrometers in height. The results of such sub-micrometer and micrometer structuring according to the invention are shown in FIGS. 4a to 4d.

3. The untreated surface of a composite oxide ceramic fiber/oxide ceramic matrix ($Al_2O_3$ fibers in a matrix of $Al_2O_3$ and $ZrO_2$) accessible to a laser beam was treated without any pre-treatment with a pulsed fiber laser of a wavelength of 1062 nm at ambient atmosphere, pressure and temperature.

For this purpose, on the surface of the substrate:
  at the positions of a freely selected dot grid with at least 30 μm spacing each,
  with a pulsed laser beam,
  with a pulse length of 50 ns,
  with a pulse peak power of approximately 15 kW,
  in a sequence of 50 to 200 pulses each,
  with a pulse spacing of 50 ns to 1 s,
  with of time-shifted/switching/alternating irradiated/approached positions, structures are generated, each of which consists of a pot profile of approximately 30 to 50 µm in diameter and 10 to 50 µm in depth, along with a differently pronounced irregular fine structure in the range from sub-micrometers to a few micrometers in height.

Figure 5A:
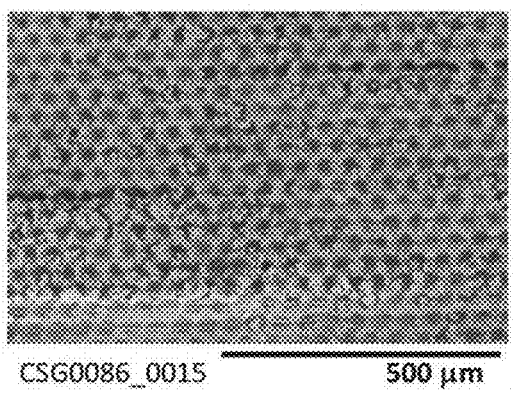
FIGS. 5a to 5d show differences resulting from a pre-selected dot grid.
Figure 5B:
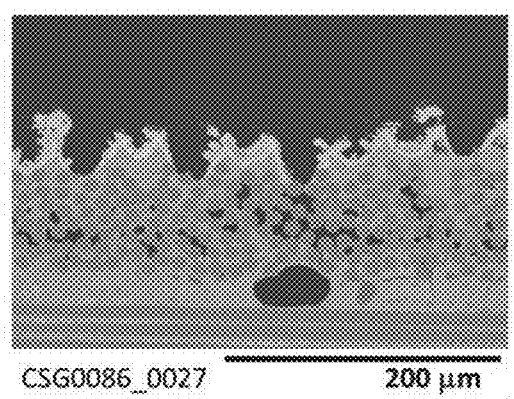
Figure 5C:
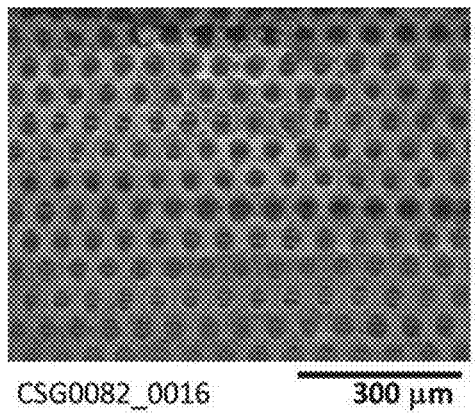
Figure 5D:
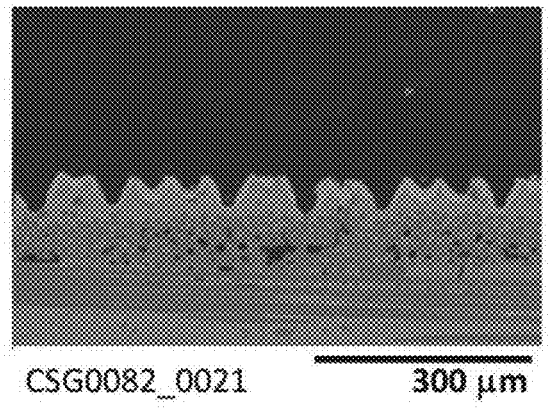

The differences resulting from the pre-selected dot grid can be seen in FIGS. 5a and 5b along with 5c and 5d, wherein, for 5a and 5b, a grid spacing of 45 µm was selected with a pulse length of 50 ns and a pulse sequence of 50 pulses, while, for 5c and 5d, a grid spacing of 60 µm was selected with a pulse length of 50 ns and a pulse sequence of 50 pulses.

The term "time-shifted/switching/alternating irradiated/approached positions" means, for example, that for points with pulse spacings greater than 50 ns, the laser, which can deliver a pulse rate of up to 100 kHz, can approach and irradiate other points in the meantime, thus saving processing time and, e.g. 100 points with 50 pulses each at 1 s pulse spacing, do not require 100×50 s of time, but advantageously only 50.0001 s (50 s+100×50 ns).

Figure 6A:
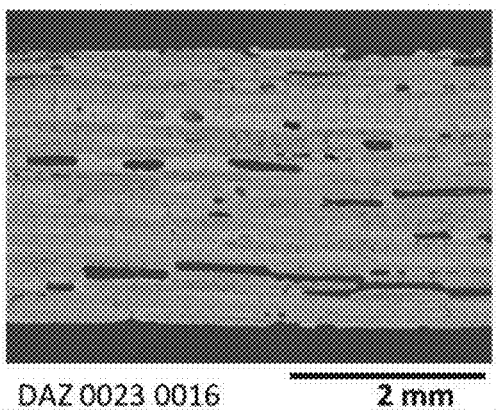
FIGS. 6a to 6c show typical microstructures of an Ox/Ox fiber composite ceramic with a porous matrix.
Figure 6B:
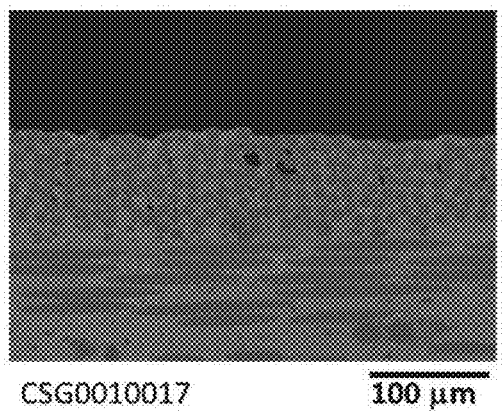
Figure 6C:
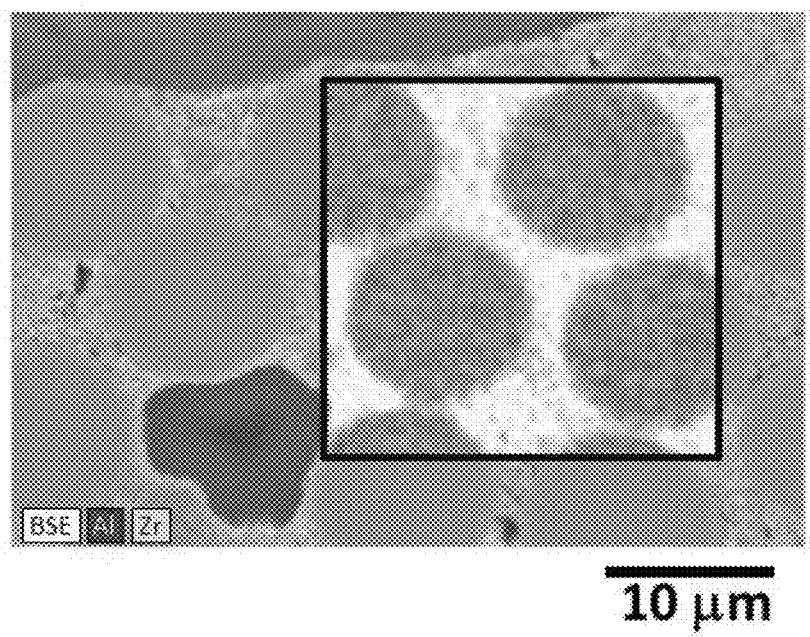

For the embodiments according to the invention, with which the surface of the substrate is initially analyzed and the method parameters are then selected preferably as a function of the properties of the substrate surface, FIGS. 6a to 6c show typical microstructures of an Ox/Ox fiber composite ceramic with a porous matrix. In the present case, the fibers comprise $Al_2O_3$, while the matrix comprises $Al_2O_3$/$ZrO_2$. In FIG. 6c, the uniform gray, circular areas represent the fiber cross-sections, the gray-mottled area represents the matrix, and the dark gray areas represent the cavities in the matrix. The structure has fluctuations with respect to porosity and fiber density, along with the fiber layer and fiber depth relative to the substrate surface over a wide range of sizes.

Figure 7:
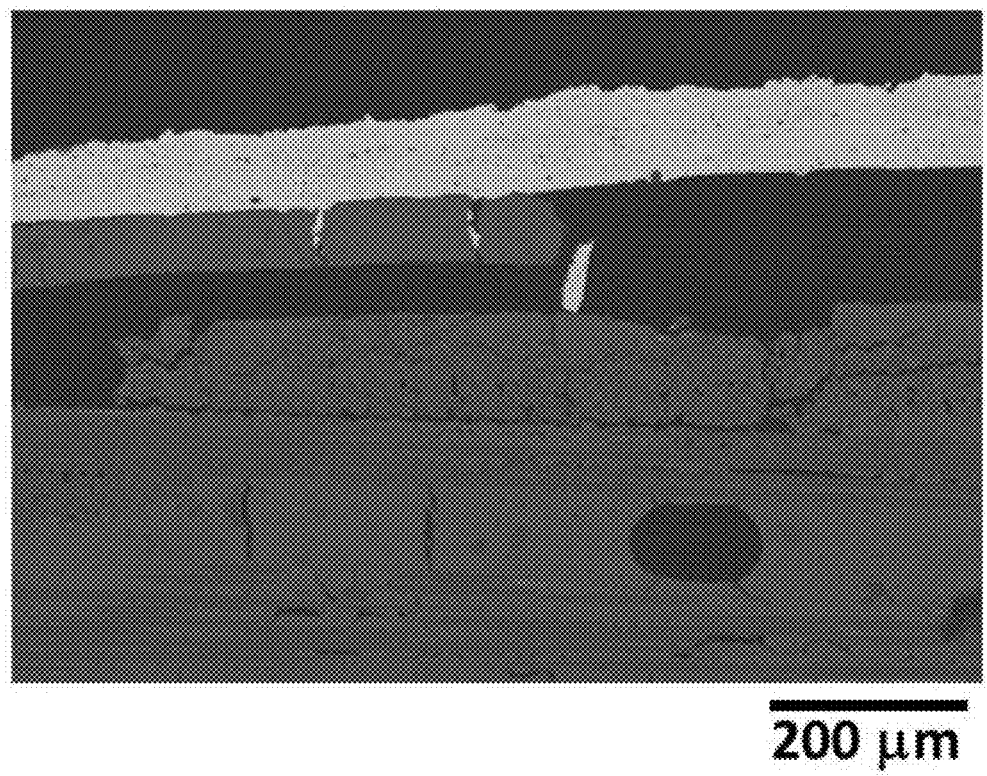
FIG. 7 shows the delamination of a thermally sprayed EBC ceramic layer that, due to different stress states and adhesion, had formed in areas with high/low fiber density or high/low fiber depth.

FIG. 7 shows the delamination of a thermally sprayed EBC ceramic layer that, due to different stress states and adhesion, had formed in areas with high/low fiber density or high/low fiber depth. The thermal sprayed layer is shown here in light gray. The dark gray areas represent the embedded material that can be found both on the thermally sprayed layer and between it and the substrate surface where the delamination took place. On the left side, it can be seen that matrix residues still adhere to the delaminated thermally sprayed layer.

Figure 8A:
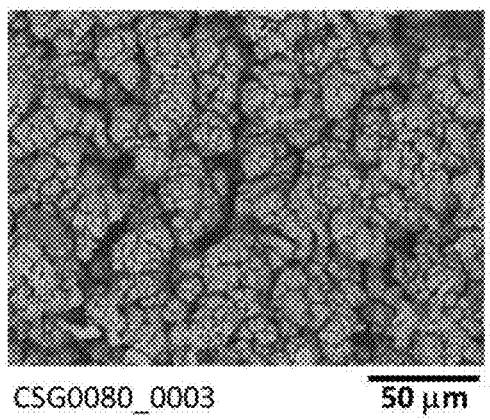
FIGS. 8a and 8b show specimens in a plan view (a) and as cross-section (b), respectively, with which, areas according to embodiments of the invention with a thicker layer thickness near the surface of the covering matrix layer were provided with a surface profile with a coarsened roughness profile.
Figure 8B:
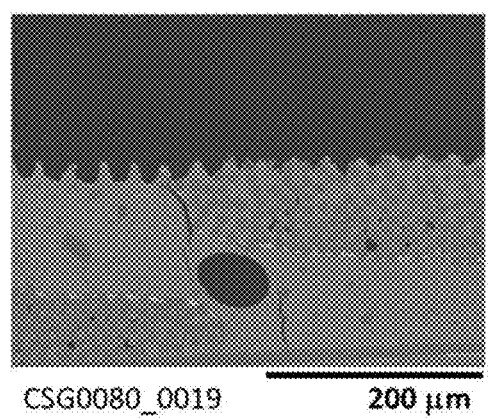

FIGS. 8a and 8b show specimens in a plan view (a) and as cross-section (b), respectively, with which, areas according to the invention with a thicker layer thickness near the surface of the covering matrix layer were provided with a surface profile with a modified (here, coarsened) roughness profile. The areas with fiber bundles close to the surface were accordingly advantageously provided only with a fine sub-micrometer structure, in order not to damage the fibers.

The analysis of the substrate surface, in particular the variation of the thermal conductivity coupled with a structural or material change, can be carried out in different ways. For example, the substrate surface can be analyzed by means of thermography in which the surface is exposed to light or heat, and at least one light or heat detector can detect the back-scattered light or heat from the surface, for example by means of an IR camera. In this respect, thermography is an imaging method for displaying the surface temperature of objects or structures, as the case may be. In this case, the intensity of the infrared radiation emanating from a point is interpreted as a measure of its temperature. The resolution of the data obtained in this manner depends on its part on the detectors used and on the excitation sources, e.g. a focused laser.

Figure 9A:
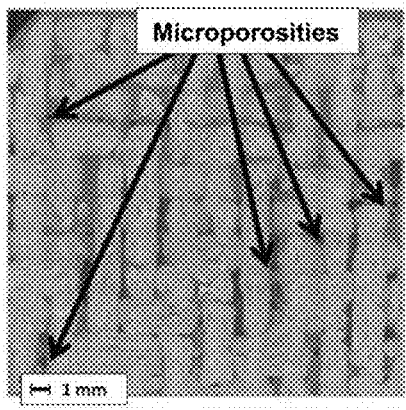
FIGS. 9a and 9b show orientation of fibers, the surface layer thicknesses, and covered ports as they result from standard thermography.
Figure 9B:
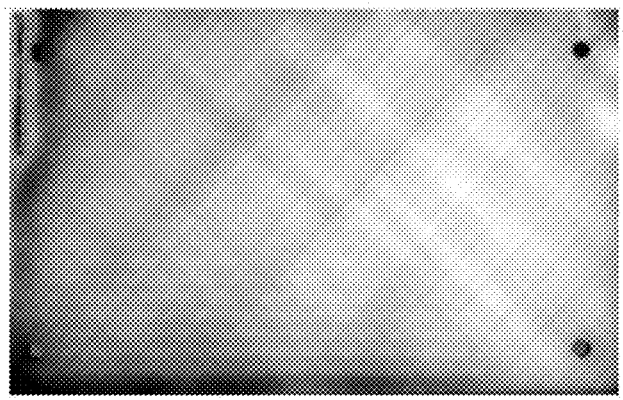

FIGS. 9a and 9b show the orientation of the fibers, the surface layer thicknesses and covered ports as they result from standard thermography.

Another suitable analytical method is, for example, spatially resolved acoustic spectroscopy (SRAS), with which optical and acoustic images reflect the mechanical properties of the surface.

Such analytical devices can be advantageously arranged directly together with the laser for structuring, similar to what is already documented for monitoring during laser welding [3].

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LITERATURE CITED IN THIS APPLICATION

[1] X. H. Liu, M. W. Lane, T. M. Shaw, E. Simonyi, "Delamination in patterned films", International Journal of Solids and Structures 44 (2007) 1706-1718.
[2] Choi, S. R., J. W. Hutchinson, and A. G. Evans, Delamination of multilayer thermal barrier coatings. Mechanics of Materials, 1999, 31(7): p. 431-447.
[3] D. Y. You, X. D. Gao and S. Katayama, "Review of laser welding monitoring", Science and Technology of Welding & Joining, April 2014, DOI: 10.1179/1362171813Y.0000000180.

The invention claimed is:

1. A method for generating a structured surface on a substrate, the method comprising:
    analyzing a substrate surface of the substrate,
    selecting, as a function of a condition of the substrate surface, method parameters including focus diameter, pulse peak power, pulse energy, point spacing, pulse length, pulse spacing and/or pulse sequence, and
    generating, by partial ablation and partial deposition via treatment with an intensive pulsed laser beam, surface structures having dimensions in the sub-micrometer range such that a multi-scale surface structure in the sub-micrometer and micrometer range adapted to intrinsically inhomogeneous properties of the substrate surface in the sub-micrometer range is generated, wherein the substrate is an inhomogeneous substrate.

2. The method according to claim 1, wherein the substrate includes:
- at least one inorganic fiber and/or one non-fibrous carbon,
- a composite material containing boron nitride with a ceramic and/or carbon matrix,
- at least one metal-ceramic composite material, and/or
- at least one composite material made of a metal and/or a metal alloy, which has thermally conductive particles and/or fibers containing carbon and/or containing boron nitride.

3. The method according to claim 1, wherein the substrate includes fibers, and wherein the parameters are selected as a function of the presence of fibers, their orientation, their proportion in a composite material, and their position relative to the substrate surface.

4. The method according to claim 1, wherein a focused laser with a beam diameter of 20 µm to 100 µm is used on the substrate surface of the substrate.

5. The method according to claim 1, wherein the surface of the substrate is approached at points of a freely selected point grid, wherein the points are approached with a spacing in a range between one-half and 10 times a laser beam diameter.

6. The method according to claim 5, wherein the points are irradiated with a pulse length between 1 ns and 1000 ns, with a pulse sequence between 50 and 500 pulses each, with a pulse spacing between 50 ns and 1 s, and with pulse peak powers between 1 kW and 100 kW.

7. The method according to claim 5, wherein individual points of the point grid are irradiated only once with the laser for the structuring of the substrate surface.

8. The method according to claim 5, wherein, for each point of the point grid, a freely selectable pulse length between 50 ns and 200 ns is set.

9. The method according to claim 5, wherein, for each point of the point grid, a pulse spacing is set between 50 ns and 1 s that is freely selectable and is variably set between individual pulses.

10. The method according to claim 5, wherein individual points of the point grid are irradiated at least partially several times for the structuring of the substrate surface.

11. The method according to claim 1, wherein the substrate includes a surface that is at least partially coated with an oxide layer.

12. The method according to claim 1, wherein the method parameters are to be set locally and are selected in immediate temporal proximity for processing by parallel evaluation of sensor data of the substrate surface.

* * * * *